(12) United States Patent
Kumar et al.

(10) Patent No.: US 12,299,615 B2
(45) Date of Patent: *May 13, 2025

(54) STRUCTURING UNSTRUCTURED DATA VIA OPTICAL CHARACTER RECOGNITION AND ANALYSIS

(71) Applicant: Wells Fargo Bank, N.A., San Francisco, CA (US)

(72) Inventors: Manoranjan Kumar, San Francisco, CA (US); Stacy R. Henryson, Clive, IA (US); Richard Penfil, II, San Francisco, CA (US); Nikhil Jog, San Francisco, CA (US); Bradley Miller, San Francisco, CA (US); Matthew D. Wilson, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,115

(22) Filed: Feb. 12, 2024

(65) Prior Publication Data

US 2024/0185151 A1     Jun. 6, 2024

Related U.S. Application Data

(63) Continuation of application No. 17/085,249, filed on Oct. 30, 2020, now Pat. No. 11,900,289.

(51) Int. Cl.
| | | |
|---|---|---|
| *G06Q 10/06* | (2023.01) | |
| *G06F 16/25* | (2019.01) | |
| *G06F 16/93* | (2019.01) | |
| *G06Q 10/0631* | (2023.01) | |
| *G06V 30/41* | (2022.01) | |
| *G06V 30/19* | (2022.01) | |

(52) U.S. Cl.
CPC ..... *G06Q 10/06315* (2013.01); *G06F 16/258* (2019.01); *G06F 16/93* (2019.01); *G06V 30/41* (2022.01); *G06V 30/19* (2022.01)

(58) Field of Classification Search
CPC .................................................. G06Q 10/06
USPC ........................................................ 705/7.25
See application file for complete search history.

(56) References Cited

U.S. PATENT DOCUMENTS

| | | |
|---|---|---|
| 7,756,800 B2 | 7/2010 | Chidlovskii |
| 7,941,382 B2 | 5/2011 | Stokes et al. |
| 8,311,960 B1 | 11/2012 | Ginzburg et al. |
| 8,589,317 B2 | 11/2013 | Paquet et al. |

(Continued)

*Primary Examiner* — Nga B Nguyen
(74) *Attorney, Agent, or Firm* — Foley & Lardner LLP (57) ABSTRACT

The present disclosure describes devices and methods of providing a technology environment for analyzing unstructured data to generate structured data. A set of electronic documents, each electronic document associated with a type of product, may be accessed. A data instance for each of the documents may be generated. The data instance may include a plurality of data fields that are based on the type of product. The electronic documents may be analyzed to identify values for each of the plurality of data fields. Analyzing the electronic documents may comprise applying a respective character recognition algorithm to respective electronic documents, and assigning a confidence factor to each of the values. The data instances comprising the values for each of the plurality of data fields may be stored in a second database.

20 Claims, 7 Drawing Sheets

(56) References Cited

U.S. PATENT DOCUMENTS

| | | | |
|---|---|---|---|
| 9,477,906 B2 | 10/2016 | Roder et al. | |
| 9,483,741 B2 | 11/2016 | Sun et al. | |
| 9,600,779 B2 | 3/2017 | Hoover et al. | |
| 9,678,957 B2 | 6/2017 | Cormack et al. | |
| 10,339,470 B1 | 7/2019 | Dutta et al. | |
| 10,372,815 B2 | 8/2019 | Simard et al. | |
| 10,423,820 B2 | 9/2019 | Santamaria-Pang et al. | |
| 10,599,395 B1* | 3/2020 | Slager | G06F 16/24556 |
| 11,900,289 B1* | 2/2024 | Kumar | G06Q 10/06315 |
| 2005/0097019 A1 | 5/2005 | Jacobs | |
| 2013/0318426 A1 | 11/2013 | Shu et al. | |
| 2014/0279716 A1 | 9/2014 | Cormack et al. | |
| 2018/0114142 A1 | 4/2018 | Mueller | |
| 2018/0330258 A1 | 11/2018 | Harris et al. | |
| 2018/0349796 A1 | 12/2018 | Gibbs et al. | |
| 2018/0373711 A1* | 12/2018 | Ghatage | G06V 30/412 |
| 2019/0114370 A1 | 4/2019 | Cerino et al. | |
| 2019/0164086 A1 | 5/2019 | Amit et al. | |
| 2019/0294797 A1 | 9/2019 | Harms et al. | |
| 2019/0361980 A1 | 11/2019 | Biesterfeld | |
| 2020/0334456 A1 | 10/2020 | Sridharan | |
| 2021/0110527 A1* | 4/2021 | Wheaton | G06T 7/0002 |
| 2021/0357633 A1 | 11/2021 | Bade | |

* cited by examiner

STRUCTURING UNSTRUCTURED DATA VIA OPTICAL CHARACTER RECOGNITION AND ANALYSIS

CROSS-REFERENCE TO RELATED APPLICATIONS

This application is a continuation of U.S. patent application Ser. No. 17/085,249 filed Oct. 30, 2020, the entirety of which is herein incorporated by reference.

TECHNICAL FIELD

The present disclosure relates to machine learning and artificial intelligence solutions for automatically structuring unstructured data.

BACKGROUND

A large enterprise may have many unintegrated databases and/or databases with uncategorized data. The uncategorized data may include various data elements in different formats. For example, the uncategorized or unstructured data may include image files, portable document format (PDF) files, text files, hypertext markup language (HTML) files, etc. Each file may include information that is relevant to accounts owned or generated by the enterprise. In order for the enterprise to accurately account for all of the data for either internal use or for reporting, manual operations may needed to be performed by agents of the enterprise. However, subjective interpretation and analysis of data may be prone to errors. Moreover, the data may be so large that agents cannot feasibly navigate or analyze all of the data. Consequently, agents may only be able to analyze a sample size, which leads to less robust reporting and does not accurately represent all of the information in the databases.

SUMMARY

In one aspect, various embodiments of the invention disclosed herein are related to a method of analyzing unstructured data, the method comprising: accessing, via a processor, from a database, a plurality of electronic documents, each electronic document associated with a type of product; generating, via the processor, a data instance for each of the plurality of documents, the data instance comprising a plurality of data fields that are based on the type of product; analyzing, via the processor, the electronic documents to identify values for each of the plurality of data fields, wherein analyzing the electronic documents comprises applying a respective character recognition algorithm to respective electronic documents, and assigning a confidence factor to each of the values; and storing, via the processor, the data instances comprising the values for each of the plurality of data fields within a second database.

In another aspect, various embodiments of the invention disclosed herein may relate to a computer implemented method of analyzing a state of an enterprise, the method comprising: accessing, via a processor, from a database, a plurality of electronic documents, each electronic document associated with a type of product; generating, via the processor, a data instance for a first document of the plurality of electronic documents, the data instance comprising a plurality of data fields that are based on a first type of product determined to be associated with the first document; analyzing, via the processor, the first document to identify values for each of the plurality of data fields, wherein analyzing the electronic documents comprises applying a character recognition algorithm to the first document, and assigning a confidence factor to each of the values; and providing, via the processor, a report of the data instances in a graphical user interface (GUI).

In yet another aspect, various embodiments of the invention disclosed herein may relate to a system, comprising: a display configured to present a graphical user interface (GUI); a memory comprising a first database and a second database; and a processor and program logic stored in memory and executed by the processor, the program logic including auditing logic configured to: access a plurality of electronic documents from the first database, each electronic document associated with a type of product; generate a data instance for a first document of the plurality of electronic documents, the data instance comprising a plurality of data fields that are based on a first type of product determined to be associated with the first document; analyze the first document to identify values for each of the plurality of data fields, wherein analyzing the electronic documents comprises applying a character recognition algorithm to the first document, and assigning a confidence factor to each of the values; and providing a report of the data instances in a graphical user interface (GUI).

These and other features, together with the organization and manner of operation thereof, will become apparent from the following detailed description and the accompanying drawings.

BRIEF DESCRIPTION OF THE DRAWINGS

The foregoing and additional features of the present disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

DETAILED DESCRIPTION

The present disclosure describes devices and methods for monitoring, analyzing, and providing a report output from multiple databases and documents. The enterprise may have multiple divisions, each with one or more computing systems, many user devices, and potentially different databases associated with each of the one or more computer systems. The many computing systems may have independent operations or functions or even be partially or wholly siloed (e.g., for security reasons), and may include many data sources which may be unconnected, not standardized, and/or otherwise including variable data types and formats. Implementing an enterprise-wide report (e.g., an audit report) that includes all of the relevant data throughout the enterprise may not be possible by agents. Accordingly, the consequences of a report by agents may be minimized to a sample size, agents may misinterpret data, or other errors such as double counting particular data may be present. Such results and consequences may result, for example, from unavailability or improper use of data and subjective application of applicable standards of the report. Consequently, the enterprise may not have the ability to accurately and efficiently account for the active obligations of the enterprise or may fall out of regulatory compliance.

In various embodiments, the devices and methods described herein describe a technology platform for analyzing data from multiple different data sources in order to efficiently and accurately account for a state of the enterprise. For example, the state of the enterprise may include an audit of the outstanding obligations of the enterprise, a geographic representation of the outstanding obligations, or other breakdowns of the outstanding obligations. Moreover, in certain embodiments, the state of the enterprise may include resolved obligations or other metrics that are needed in order to comply with regulatory reporting. For example, the enterprise may have multiple different obligations created from products or services offered and accepted by clients. Such obligations may include loan products, credit products, or other products that are being serviced by the enterprise. In addition to the obligations generated or created by the enterprise, the enterprise may also purchase or merge with other companies or enterprises that thereby transfer the other company's obligations to the enterprise. The data representing the other company's obligations may not be structured in a manner needed by the enterprise for reporting or auditing. Rather, for example, the data representing the other company's obligations may include various different documents of various formats that need to be analyzed in order to accurately account for all of the obligations. The various different documents may include portable data file (PDF) type documents, image documents (e.g., a scan of a document), or other file types that may not simply be searchable. Accordingly, the devices and methods described herein improve the ability of the enterprise computing system to analyze and extrapolate data from multiple different file types for each document in various databases to efficiently and accurately generate a report.

The enterprise computing system is a computing system that is associated with or owned by an enterprise. In some embodiments, the enterprise may include, for example, a financial institution, a government enterprise, or a corporate enterprise. The enterprise computing system is communicably coupled to the multiple user devices such that the enterprise computing system can receive and store client and product data. For example, the client and product data may include information regarding respective clients, their outstanding products, correspondences between an agent and the client, and the respective data regarding their outstanding products. The respective data may be dependent on the particular product. For example, a loan product may include a closing date, an interest rate, information regarding the credit of the client, a loan amount, etc. The enterprise computing system is configured to access the unstructured data including the various documents from one or more databases, analyze the various documents to extrapolate the client and product data, create a data instance for each of the various documents including the client and product data, store the data instance in a database, and generate a global report from one or more of the data instances. The enterprise computing system may then output the global report via a graphical user interface to an agent. In some embodiments, the enterprise computing system may analyze each of the various documents by determining a product associated with each document to determine particular fields of the client and product data that the enterprise computing system is to find in the respective document. The enterprise computing system may then employ optical character recognition (OCR) or other recognition algorithms to parse through and search for the particular fields of the client and product data. Examples of such recognition algorithms and potential identification methods are discussed in further detail below. Thus, the various methods and devices described herein improve the ability of the enterprise computing system to analyze unstructured data (e.g., various documents from various databases) in order to transform the unstructured data into a structured data set (e.g., database including data instances with respective pre-defined data fields) in order to output a comprehensive report to an agent.

Figure 1:
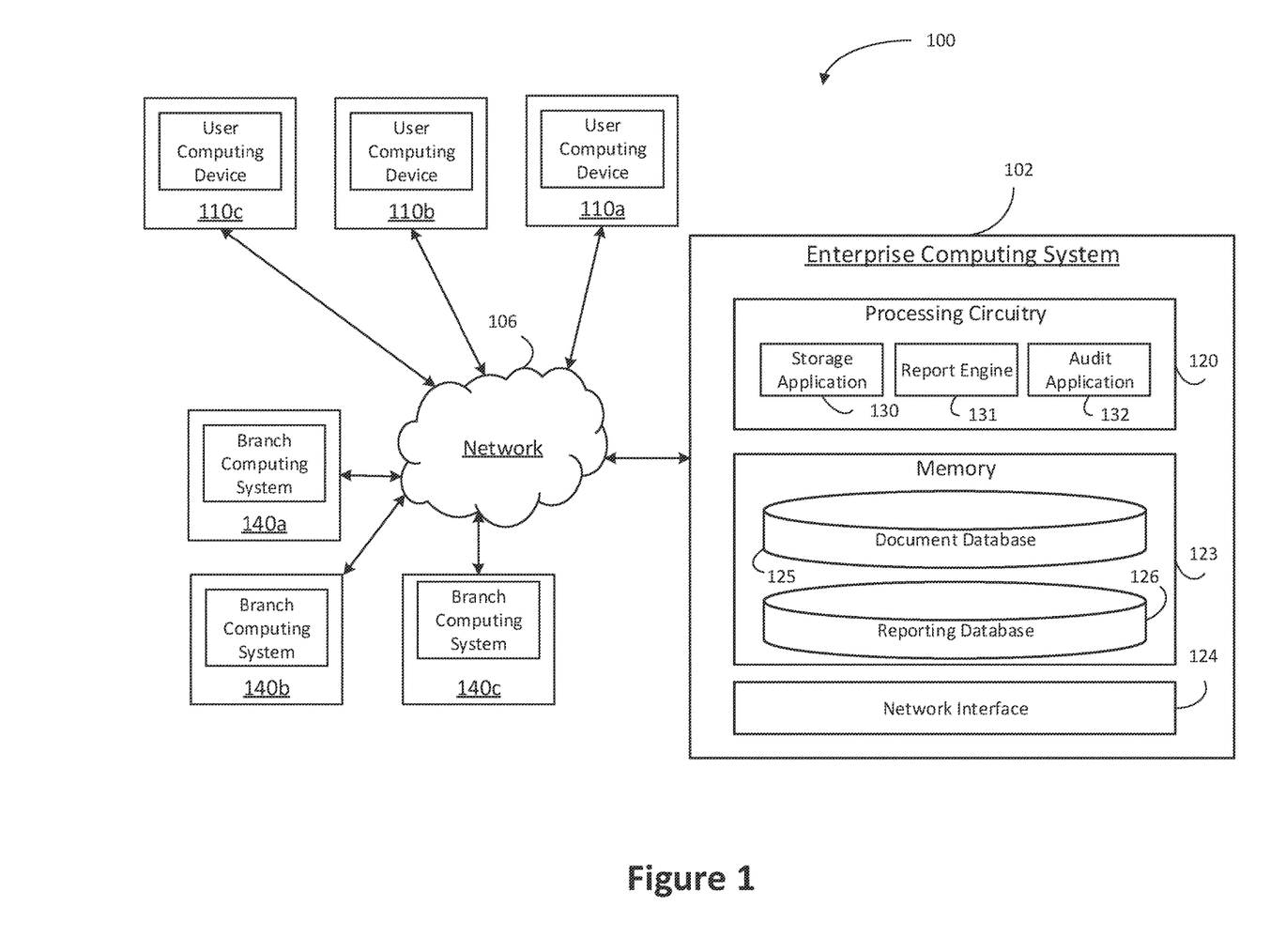
FIG. 1 depicts a block diagram of a data analysis system in accordance with illustrative embodiments in accordance with various potential embodiments.

Referring now to FIG. 1, a block diagram of a data analysis system 100 is depicted in accordance with illustrative embodiments. The data analysis system 100 includes an enterprise computing system 102 and multiple user-operated computing devices 110a-c configured to communicate via a network 106. Enterprise computing system 102 may further comprise computing systems 140a-c (of, e.g., various branches, offices, outposts, and/or other divisions), which may communicate with each other (e.g., via network 106 or another network) or may not communicate with each other. Computing systems 140a-c may each comprise one or more databases with various data.

The multiple user computing devices 110a-c may include one or more personal computing devices, desktop computers, mobile devices, or other computing devices that may be utilized or accessed by clients, agents, or other users. In general, the enterprise computing system 102 may receive inputs from clients, agents, or other users via the user computing devices 110a-c or receive data from the branch computing systems 140a-c. For example, an agent may import various documents via a device (e.g., scanner or memory drive) to the branch computing system 140a-c, and the branch computing system 140a-c may transmit the various documents to the enterprise computing system 102. In some embodiments, the enterprise computing system 102 may recognize or determine for each document of the various documents as being unstructured (e.g., documents that need to be analyzed) and store the respective document within a document database 125. In some embodiments, the enterprise computing system 102 may receive structured data from the user computing devices 110*a-c* or the branch computing systems 140*a-c* and store the structured data in a reporting database 126. For example, an agent or client via respective computing devices may apply for a product from the enterprise by entering in all of the information associated with an application (e.g., loan application) for the product and, upon the enterprise computing system 102 approving the application (e.g., underwriting the loan), the enterprise computing system 102 may automatically store the client and product information associated with the application within the reporting database 126. That is, because the enterprise computing system 102 has generated data fields for the application approval process and received client and product data in a structured manner (e.g., via the agent or client entering information into known data fields presented via a graphical user interface during the application process), the enterprise computing system 102 may be able to auto-generate a reporting data instance including the client and product data and store the reporting data instance into the reporting database 126 without needing to analyze a document associated with the product. In this way, the enterprise computing system 102 may reduce processing requirements during a reporting period by only needing to analyze document files that do not have a reporting data instance associated therewith.

The enterprise computing system 102 includes the one or more branch computing systems 140*a-c*, processing circuitry 120, memory 123, and a network interface 124. In some embodiments, the processes described herein may be implemented by the processing circuitry 120, the one or more branch computing systems 140*a-c*, or a combination thereof. The enterprise computing system 102 may include servers that can, for example, serve websites to one or more of the computing devices 110*a-c*. In some embodiments, each of the user computing devices 110*a-c* and computing systems 140*a-c* may include a processor, memory, communications hardware for transmitting and receiving data, and a display for presenting a graphical user interface (GUI). The enterprise computing device 102 may be configured to output the GUI onto the display of any of the user computing devices 110*a-c* (and/or computing systems 140*a-c*). For example, the enterprise computing device 102 may be configured to provide instructions (e.g., HTML instructions) to one or more of the user computing devices 110*a-c* (and/or computing systems 140*a-c*) that cause or allow the respective computing device 110*a-c* to display the GUI (e.g., or information of the GUI) generated by the enterprise computing device 102.

The network 106 may be any type of network. For example, the network 106 may be a wireless network interface (e.g., Internet, WI-FI, etc.), a wired network interface (e.g., Ethernet), or any combination thereof. The network 106 is structured to permit the exchange of data, values, instructions, messages, and the like between and among various components of FIG. 1.

The network interface 124 is structured to enable the enterprise computing system 102 to connect to and to exchange information over the network 106 with, for example, the branch computing systems 140*a-c* or the user computing devices 110*a-c*. The network interface 124 may be coupled to the processing circuitry 120 in order to enable the processing circuitry 120 to receive and transmit messages, data, and information via the network 106.

The memory 123 includes a document database 125 and a reporting database 126. In some embodiments, the memory 123 may also include a client resolution database structured as a repository for customer information in varied formats. The client database is configured to store, hold, and maintain information for a plurality of clients of the enterprise. For example, the client database may store information such as client information (e.g., names, addresses, phone numbers, and so on), preferred branch locations of the enterprise, products provided by the enterprise and used by the client, or other information regarding the relationship between the enterprise and the client.

The document database 125 is configured to store, hold, and maintain documents from various data sources that need to be analyzed. For example, a document may include a note (e.g., loan note), a terms sheet associated with a product for client, or any document that includes information that needs to be analyzed for an associated report. The document may be a scanned version of the original document stored in various file types (e.g., text file type, PDF file type, image file type, encrypted file type, etc.). The document may be received from one or more of the branch computing systems 140*a-c*, imported by an agent via a computing device, or imported or received from a third party computing system. For example, the enterprise may purchase obligations from products (e.g., purchase loan notes) originally created by a different entity, the documents associated with the obligations and/or products purchased may then be received or imported into the enterprise computing system 102 and stored in the document database 125. In some embodiments, the document database 125 may be manually imported by an agent. For example, in some embodiments, the agent may identify the products and associated documents that are to be analyzed for a report, the agent may then upload, import, or transmit the associated documents to the enterprise computing system 102 with a request to load the associated documents into the document database 125. The enterprise computing system 102 may then analyze the associated documents and generate a targeted report for the agent based thereon. In this way, the enterprise computing system 102 is versatile in the scope of reporting, which allows the enterprise to be as targeted or broad as deemed necessary.

The reporting database 126 is configured to store, hold, and maintain structured data instances that can be accessed in order to generate a report. For example, the reporting database 126 may include a data instance. The data instance may be unique to a product with a client. The data instance may include multiple data fields. The multiple data fields may be unique to the product associated with the data instance. For example, the data instance may be unique to a mortgage note or loan to a residential customer. The data instance may include a respective data field for each of the type of the product (e.g., mortgage note to a residential customer), name of the client associated with the product (e.g., legal name of the residential customer), geolocation identifier of a home associated with the mortgage (e.g., address, state, and/or zip code), interest rate of the mortgage note, total loan amount, total outstanding balance on the mortgage, and/or total interest paid to date. It is to be appreciated that each product may have different data types based on the type of product. In some embodiments, the reporting database 126 may store the data instances in an order corresponding to when the respective data instances are created (e.g., time stamped). In some embodiments, the reporting database 126 may store the data instances in an order corresponding to the time that the product was created (e.g., closing date). In some embodiments, the reporting database 126 may be stored and ordered according to the product type associated with each data instance.

The processing circuitry 120 may include one or more processors and non-transitory machine readable medium that when executed by the processor, causes the processor to perform or assist in performing any of the methods, operations, or steps described herein. The processing circuitry 120 includes a storage application 130 that is designed to receive information (e.g., from the multiple user computing devices 110*a-c* and/or computing systems 140*a-c*) and store the information within the memory device 123. In some embodiments, the storage application 130 may store the information within the memory device 123 in an ordered structure where each complaint or concern is an instance with multiple data fields associated with that instance. In some embodiments, the storage application 130 may store information received or output from an audit application 132 in an instance with multiple data fields. The multiple data fields may be pre-defined. In some embodiments, the multiple data fields may be pre-defined by product type or by the particular report being generated by the audit application 132.

The processing circuitry 120 also includes the audit application 132. The audit application 132 may be configured to access the data in the document database 125, analyze the data in the document database 125, and output a data instance for each document in the document database 125. In some embodiments, the audit application 132 includes one or more character recognition algorithms that can be deployed to analyze the respective documents. For example, the audit application 132 may start with a first of the documents, determine a product type associated with the first document, determine pre-defined data fields that should be retrieved from the first document, analyze the documents using at least the one or more character recognition algorithms to retrieve values for each of the pre-defined data fields, and output a data instance including the data fields and respective values. The data instance may then be stored (e.g., via the storage application 130) within the memory 123. In some embodiments, the audit application 132 is also configured to output a graphical user interface displaying the results of the analysis of the documents. The results may include a confidence factor for each value retrieved for the respective data fields of each data instance. In some embodiments, the results include the confidence factors for each value retrieved that are below a threshold (e.g., 70%). In some embodiments, the results include a summary that includes indications of the number of documents analyzed, the number of data fields populated, the number of data fields with errors (e.g., or likely errors due to the confidence factor being below a threshold), and/or other information regarding the analysis. In some embodiments, the summary may be displayed to an agent, the agent may then manually check the data fields that have a confidence factor below a defined threshold (e.g., pre-defined threshold or defined by the agent via a user input into the graphical user interface). Examples of the summary of results are described below in reference to FIGS. 4-5. Moreover, examples of the one or more character recognition algorithms and other methods for analyzing the documents are discussed below in reference to FIGS. 2-3.

The processing circuitry 120 may also include a report engine 131. The report engine 131 is configured to access the information within the reporting database 126 and output a report. In some embodiments, the report engine 131 may generate a graphical user interface and display the interface to an agent at the computing devices 110*a-c* or branch computing systems 140*a-c*. The graphical user interface may display multiple options for the agent to select in order to generate a particular report. For example, one or more user inputs may indicate that the report should include particular product types, particular data fields thereof, data ranges for the particular product types, and particular summary information. The report engine 131 may then step through the data within the reporting database 126 and output a report according to the user inputs (e.g., agent-defined parameters). In some embodiments, the report engine 131 may display the report via the graphical user interface. In some embodiments, the report engine 131 may generate a document (e.g., text file, excel file, PDF, etc.) including the report and automatically transmit the document to one or more mobile devices, user devices, pre-defined email addresses, and/or store the document within the memory 123. Additional details regarding the graphical user interface are discussed below in reference to FIGS. 6-7.

Figure 2:
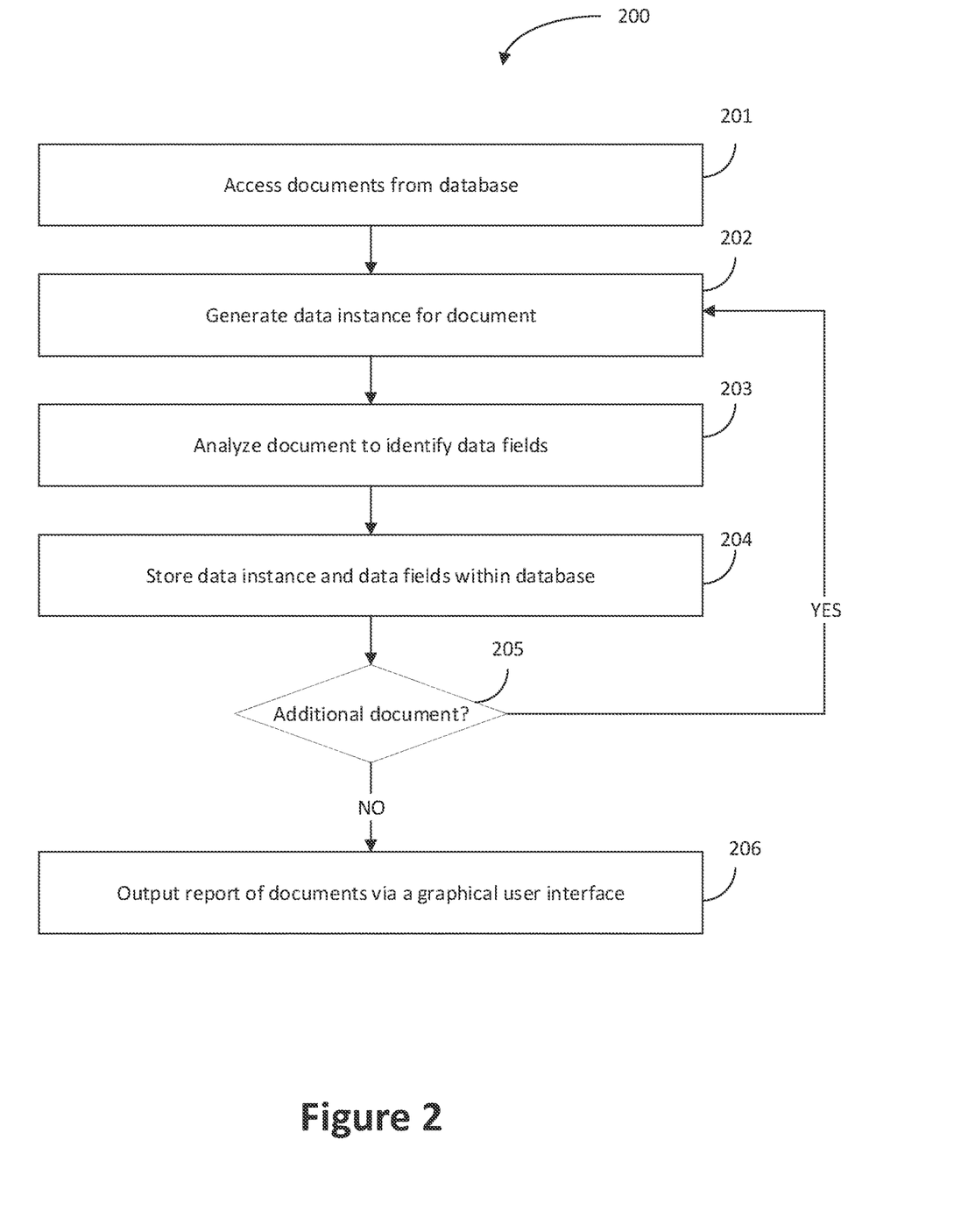
FIG. 2 depicts a flow diagram of a method of a data analysis system in accordance with various potential embodiments.

Referring now to FIG. 2, a flow diagram of a method 200 of a data analysis system is depicted in accordance with illustrative embodiments. The method 200 may allow for the enterprise computing system 102 to have the ability to efficiently and accurately analyze unstructured data in order to create a structured database that can further be used to generate a comprehensive and accurate report detailing, for example, the status of the enterprise at a given time. Moreover, the method 200 ensures accuracy of data by determining confidence factors for each value identified or extracted from the unstructured data based on one or more rules. Accordingly, values with low confidence factors can be provided via a graphical user interface to an agent of the enterprise that may be able to manually analyze the questionable value.

At process 201, the enterprise computing system 102 accesses data from the document database 125. For example, the enterprise computing system 102 may access all of the documents stored in the document database 125. In some embodiments, the enterprise computing system 102 may access a particular subset of the documents in the document database 125. For example, a user, via a graphical user interface provided by the enterprise computing system 102, may enter a first user input defining the particular subset of documents that the enterprise computing system 102 is to access and analyze. The first user input may define or indicate to the enterprise computing system 102 that the enterprise computing system 102 is to access and analyze, for example, a first number of documents (e.g., 1000, 2000, 2501, etc.), all documents relating to a particular product, or all documents dated (e.g., having an associated closing date) within a particular range of dates. The enterprise computing system 102 may then access all of the documents in the document database according to the attributes defined or indicated by the first user input. In some embodiments, the enterprise computing system 102 may receive one or more documents from a third party computing system or via a manual importation of the documents into the document database 125. In other embodiments, the enterprise computing system 102 may automatically sort received documents based on whether there is an indication that the associated product of the respective document needs to be analyzed. For example, if the enterprise computing system 102 identifies that a particular document already has a respective data instance with values for each data field in the reporting database, the enterprise computing system 102 may not include the document within the document database 125 or otherwise not analyze the particular document.

At process 202, the enterprise computing system 102 creates a data instance for a first document. For example, the enterprise computing system 102 may determine, based on an indication in the document, a type of product associated with the document. In some embodiments, the indication may include name values of the document, a variable attributed to the document via a user input, or a title of the document. In some embodiments, the indication may include a location within the document database 125 that the first document was stored. For example, the document database 125 may store the documents by category and/or product type. The enterprise computing system 102 may then cross-reference the determined type of product within memory 126 to determine a set of pre-defined data fields that that are associated with the type of product. For example, the enterprise computing system 102 may determine that the type of product is related to a retail mortgage note and further determine that the set of pre-defined data fields for the retail mortgage note include a closing date, a client name, a loan amount, an interest rate, a signature block, and/or other data fields pre-defined, within the memory 126, data fields that are needed from the document for reporting. The data instance may include a global variable that is set based on the type of product and the set of pre-defined data fields. In some embodiments, this indicates to the enterprise computing system 102 the values (e.g., a value for each of the pre-defined data fields) that should be in the document and that need to be found.

At process 203, the enterprise computing system 102 analyzes the document to identify a value for one or more respective pre-defined data fields of the data instance. For example, for each of the pre-defined data fields, the enterprise computing system 102 analyzes the contents of the document to find a value for the respective data field. In some embodiments, the enterprise computing system 102 may identify the document file type (e.g., text file, PDF file, image file format, etc.), convert the document file type to a searchable format, and then analyze the contents (e.g., text of the searchable document) in order to identify the values for each of the pre-defined data fields. In some embodiments, the algorithm or process used to convert the document into a searchable format may be dependent on the document file type identified. For example, a first optical character recognition algorithm may be used to convert a document having an image file type and a second optical character recognition algorithm may be used to convert a document having a PDF file type. In some embodiments, the enterprise computing system 102 may retrieve from memory 126 one or more keywords associated with each of the pre-defined data fields, parse through the searchable document looking for the keywords, identify a value subsequent to the keyword, check to see if the value subsequent to the keyword is in an expected format (e.g., a string, number, or percentage, etc.), and set the value to the respective data field.

Moreover, the enterprise computing system 102 may set and associate a confidence factor for each determined value. For example, if the enterprise computing system 102 determines that the value is in the correct format (e.g., a numerical percentage value), was found in an expected location (e.g., immediately subsequent to the keyword, page of the document, or under a particular heading), includes a value within an expected range (e.g., between 1% and 6%, or a range associated with the year of the document), and there are no other conflicting values found during the analysis process, the enterprise computing system 102 may set and associated a high confidence factor for the value (e.g., over 90%). In another example, if one or more of the above-referenced determinations of the value are not met, the confidence factor may be lower (e.g., 30%-90%). Additionally or alternatively, if the enterprise computing system 102 is unable to determine or find a value for a data field, the enterprise computing system 102 may set and associate a low confidence factor (e.g., under 30%) for an estimated value or a value of null. The confidence factor may be used to flag to a user via a graphical user interface provided by the enterprise computing system 102 the determined value in order to indicate to the user that the value should be manually verified or entered. In this way, the enterprise computing system 102 is able to efficiently and reliably extract data from unstructured data sources (e.g., documents) in order to create a structured data set (e.g., having data instances and associated data fields) that can be used for reporting and analysis by agents of the enterprise. The confidence factor, for example, gives the enterprise computing system 102 the ability to interact with agents in order to indicate to respective agents that the accuracy of a value determined via the analysis, which improves the reliability and accuracy of any reports generated from the structured data set. Additional details regarding process 203 are discussed in additional detail below in reference to FIG. 3.

At process 204, the enterprise computing system 102 stores the data instance with the values for the one or more respective data fields of the data instance within a database. For example, once the enterprise computing system 102 determines a value for each of the pre-defined data fields, the analysis of the document may be deemed to be complete. The enterprise computing system 102 may store the data instance with the values in each of the pre-defined data fields within the reporting database 126. In some embodiments, the enterprise computing system 102 may store the data instances with associated time stamps (e.g., time stamps indicating the time of analysis) in consecutive order. In some embodiments, the data instances may be stored categorically according to the type of the product that the respective data instances are associated with. In an embodiment, the data instances may be stored in an order that corresponds to a particular data field. In some embodiments, the data instances may be stored according to a combination of organizational rules. For example, the data instances may be stored within a first category (e.g., in a retail category), within a type of product of the first category (e.g., mortgage notes of the retail category), and/or according to the values of a pre-defined data field (e.g., chronologically according a closing date of the mortgage note). In this way, the reporting database 126 may be structured such that the enterprise computing system 102 can reliably, accurately, and efficiently generate one or more reports.

At process 205, the enterprise computing system 102 checks to see if there are any documents that have not been analyzed. For example, the enterprise computing system 102 checks to see if there are other documents that were accessed and determined to need an analysis that have not been analyzed yet. If there are no other documents that need to be analyzed the enterprise computing system 102 may finish the method 200 or proceed to process 206. If there are other documents that need to be analyzed, the enterprise computing system 102 retrieves the next document and proceeds to analyze the next document, for example, at process 202.

At process 206, the enterprise computing system 102 outputs a report of the analyzed documents via a graphical user interface. For example, the enterprise computing system 102 may access the stored data instances and generate a report. The report may include a total number of each of the categories and/or types of products, average values for each of the values of one or more pre-defined data fields, and/or maximum and minimum values of each of the values of one or more pre-defined data fields. In some embodiments, the report may include additional information calculated from the values in the data instances. For example, in some embodiments, the report may include an expected defaults on products, expected deferment of payments, or other expected values based on the information (e.g., values) within the data instances. In some embodiments, the expected values may be calculated by one or more equations stored within the enterprise computing system 102 and output via a graphical user interface to an agent of the enterprise.

Figure 3:
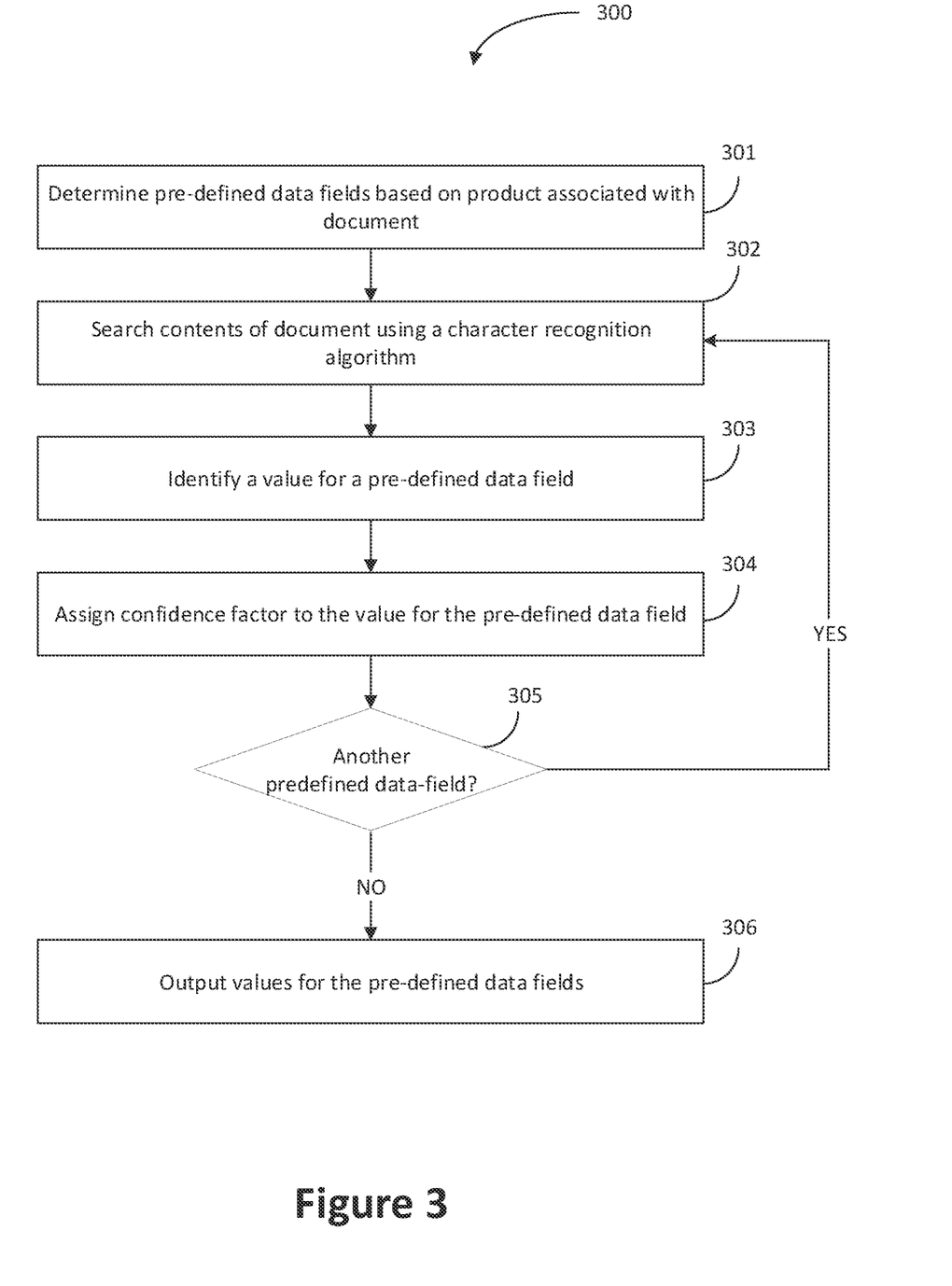
FIG. 3 depicts a flow diagram of a method of analyzing the documents of a data analysis system in accordance with various potential embodiments.

Referring now to FIG. 3, a flow diagram of a method 300 of analyzing the documents of a data analysis system is depicted in accordance with illustrative embodiments. In some embodiments, the method 300 is an example of process 203.

At process 301, the enterprise computing system 102 identifies a type of product associated with the document and pre-defined data-fields associated with the type of product. For example, the enterprise computing system 102 may determine that the document is associated with a first category of products (e.g., retail products) and/or a first type of product (e.g., a mortgage note). In some embodiments, the document may include one or more variables associated with the document that indicate the type of product associated with the document. For example, the document database 125 may store the documents with the one or more variables (e.g., that may be set by a user) to indicate the type of product associate with the document. In some embodiments, all of the documents (e.g., accessed documents for analysis) may be the associated with the same type of product. For example, all of the documents associated with a particular product may be uploaded into the document database 125 and a user, via a user input into a graphical user interface, indicates that all of the documents to be accessed and analyzed are associated with a particular product. The enterprise computing system 102 may then determine a set of pre-defined data fields that are associated with the type of product. The set of pre-defined data fields indicate to the enterprise computing system 102 the data values that should be within the document that the enterprise computing system 102 is to identify.

At process 302, the enterprise computing system 102 searches the document via a character recognition algorithm. For example, the enterprise computing system 102 may convert the document into a searchable format. The document may be converted using one or more optical character recognition algorithms. In some embodiments, the document may be converted using an optical character recognition algorithm that is based on the file type of the document. However, optical character recognition algorithms are prone to errors in identifying every character or section of the document correctly, accordingly additional smart features of method 300 described herein ensure that the document is accurately analyzed.

At process 303, the enterprise computing system 102 identifies a value for a first pre-defined data field. For example, the text of the searchable document (e.g., searchable after the OCR algorithms are performed) may be parsed or searched for particular keywords to identify a section of the document relevant to respective data fields. The enterprise computing system 102 may retrieve or access from memory the one or more keywords for each of the pre-defined data fields. In some embodiments, the enterprise computing system 102 searches or parses through the contents (e.g., text) of the document looking for the keywords and once found, the enterprise computing system 102 may identify a value for the respective data field based on one or more rules. For example, a first rule may be to check the value subsequent to the keyword and check whether the value subsequent to the keyword matches an expected variable type for the data field. A second rule may include searching or parsing the contents of the document to search for keywords associated with a heading or section of the document that is predetermined to likely hold the respective value. In some embodiments, additional rules may be used to identify the value for the first pre-defined data field and verify that the identified value is correct. In some embodiments, if the enterprise computing system 102 is unable to identify a value for the first pre-defined data field, the value may be set to null or a pre-defined value and flagged for review (e.g., flagged via a confidence factor of 0).

At process 304, the enterprise computing system 102 assigns a confidence factor to the value of the first pre-defined data field. For example, the enterprise computing system 102 determines a score indicating how likely the identified value is correct. The confidence factor may be determined based on one or more pre-defined formulas and/or rules. For example, once the first value for the first pre-defined data field is identified, one or more rules or formulas may be used to determine and assign a confidence factor to the first value. The location of the first value within the document, the format of the first value, and the contents of the first value may all be analyzed to determine the confidence factor. In some embodiments, an algorithm based on, comprising, or consisting of a Levenshtein Distance analysis may be used to determine whether the keyword found in the document to identify the first value is identical to the expected keyword (e.g., keyword stored in memory for the first data field). The Levenshtein Distance algorithm may be used to identify a number of changes (e.g., change in characters or addition of characters) that the keyword found in the document would need to undergo to identically match the expected keyword. If a Levenshtein Distance determined from the algorithm is "0" (e.g., the keywords are identical), the confidence factor may be set high (e.g., 90% or greater), while greater distances may yield lower confidence factors.

Moreover, the enterprise computing system 102 may include other factors in determining the confidence factor. For example, the enterprise computing system 102 may determine (e.g., via parsing through the contents) the section that the first value was identified in (e.g., determined based on matching a header to known keywords). If the header matches or nearly matches (e.g., has a Levenshtein Distance of 3 or less) an expected header or section that the first value would be, then the confidence factor may be increased. Moreover, if the header does not match an expected header or section, then the confidence factor may be reduced. In some embodiments, the type of data value identified for the first value may be compared to an expected type of data. For example, if the first of the predefined data fields has an expected variable type of a string, the enterprise computing system 102 may lower the confidence factor of the first value if the first value is a number. Accordingly, the enterprise computing system 102 may use one or more rules and formulas to determine and assign a confidence factor to the first value, which ensures the accuracy of the first value and flags to an agent any identified values that have a confidence factor below a threshold.

At process 305, the enterprise computing system 102 determines if there is another pre-defined data field that has not been assigned a value. For example, the enterprise computing system 102 may step through each of the set of pre-defined data fields. After a value for each of the pre-defined data fields are found, the enterprise computing system 102 may determine if there is another data field. If there are more data fields that need values, the enterprise computing system 102 may proceed to process 302 and identify the next value (e.g., a second value) for a second of the pre-defined data fields. If all of the set of the pre-defined data fields have been assigned values, the enterprise computing system 102 may proceed to process 306.

At process 306, the enterprise computing system 102 outputs the values of the pre-defined data fields and associated confidence factors. The enterprise computing system 102 may output the values of the pre-defined data fields and associated confidence factors via a graphical user interface. The graphical user interface may include a graphical indicator showing the data fields that have a low confidence factor (e.g., below a threshold). The user may be able to interact with the graphical user interface to see a list of the data fields having a low confidence factor and may further be able to open the associated document in order to verify one or more of the data fields. Upon verifying a particular data field, the agent or user via the graphical user interface may be able to set the confidence factor to a new value (e.g., 1). In this way, the data field may no longer be flagged as needing review. In some embodiments, the enterprise computing system 102 may first analyze all of the documents and then output a summary of the analysis including the graphical and interactive indicators that allow an agent or user to verify or check the identified values for the one or more pre-defined values. An example of such summary is described in additional detail below in reference to FIG. 4. Moreover, the enterprise computing system 102 may output the values of the pre-defined data fields and associated confidence factors into the reporting database 126 as described above.

Figure 4:
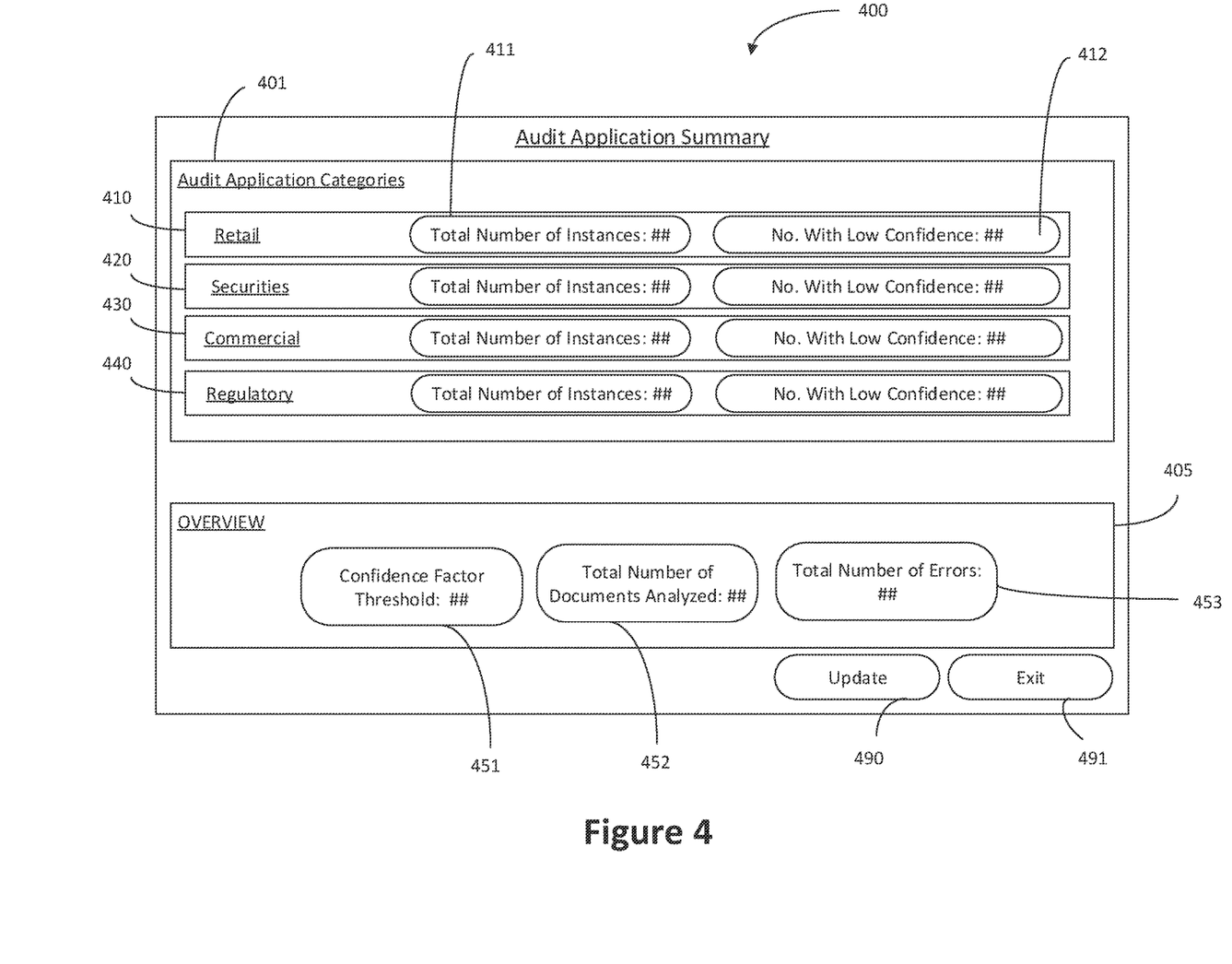
FIG. 4 depicts a graphical user interface of an audit application of a data analysis system in accordance with various potential embodiments.

Referring now to FIG. 4, a graphical user interface 400 of a data analysis system is depicted in accordance with illustrative embodiments. For example, the graphical user interface (GUI) 400 depicts a first output summary of the analysis of the documents. The output summary may be configured to convey the results of the analysis processes from the audit application, for example, described in reference to process 203 and method 300. The output summary may include an interactive GUI that is configured to improve the ability of the enterprise computing system 102 to interact with a user to ensure the accuracy of the values retrieved by the entity computing system 102.

The output summary includes a list of categories 401 and an overview section 405. For example, the list of categories may include one or more pre-defined categories such as a retail category 410 (e.g., a first category), a securities category 420 (e.g., a second category), a commercial category 430 (e.g., a third category), and/or a regulatory category 440 (e.g., a fourth category). In some embodiments, there may be additional or fewer categories. In some embodiments, the number and type of categories may be dependent upon particular data in a respective report that needs to be included. Each category may include one or more types of products associated therewith. For example, the retail category 410 may include a student loan type of product, an international auto loan type of product, an international credit card type of product, an international home equity loan type of product, an international first lien mortgage type of product, an international other consumer loan type of product, a domestic small business loan type of product, and/or a student loan type of product. In some embodiments, the particular categories and types of products in each category may be dependent upon the application in which the system is being utilized or deployed.

Each of the categories 410, 420, 430, and 440 may include one or more graphical icons that are configured to indicate results of the analysis made by the audit application. For example, the retail category 410 includes a first graphical icon 411 and a second graphical icon. The first graphical icon 411 includes an indication of the total number of instances (e.g., data instances) created by the audit application during, for example, method 200. In some embodiments, the first graphical icon 411 is selectable such that, when selected, the GUI 400 is redirected and displays a list of products types in the retail category 411 along with other graphical icons indicating the number of instances within each of the product types. The second graphical icon 412 includes an indication of the number of data instances that include one or more values in respective data fields that are low (e.g., below a threshold). In some embodiments, the threshold may be pre-defined and hard coded. In some embodiments, the threshold may be a variable that can be set via a user input comprising a selection of the third graphical icon 451. In some embodiments, the second graphical icon may also be selectable, such that, when selected, causes the GUI 400 to redirect and display a list of the data instances within the respective category (e.g., retail category 410) with additional graphical indicators depicting the particular data fields having values with associated low confidence factors. The agent or user may further interact with the additional graphical indicators to manually set the values after verifying the values. In response to a user manually setting a value of the data field, the confidence factor may automatically set to a high value (e.g., 1.0 or 100%). In some embodiments, each category 410, 420, 430, and/or 440 may include additional or fewer icons each indicating a result from the audit application.

The overview section 405 may include the third graphical icon 451, a fourth graphical icon 452 that depicts the total number of documents analyzed, and a fifth graphical icon 453 that depicts the total number of errors that occurred when the audit application was run. The fourth and fifth graphical icons 452 and 453 may also be selectable such that, when selected, cause the GUI 400 to redirect and display more particular data associated with the graphical icons. The GUI 400 may also include an update button 490 that causes the audit application to run again and provide an updated GUI 400. The GUI 400 may also include an "exit" button or icon that, when selected via a user input, causes the GUI 400 to close.

Figure 5:
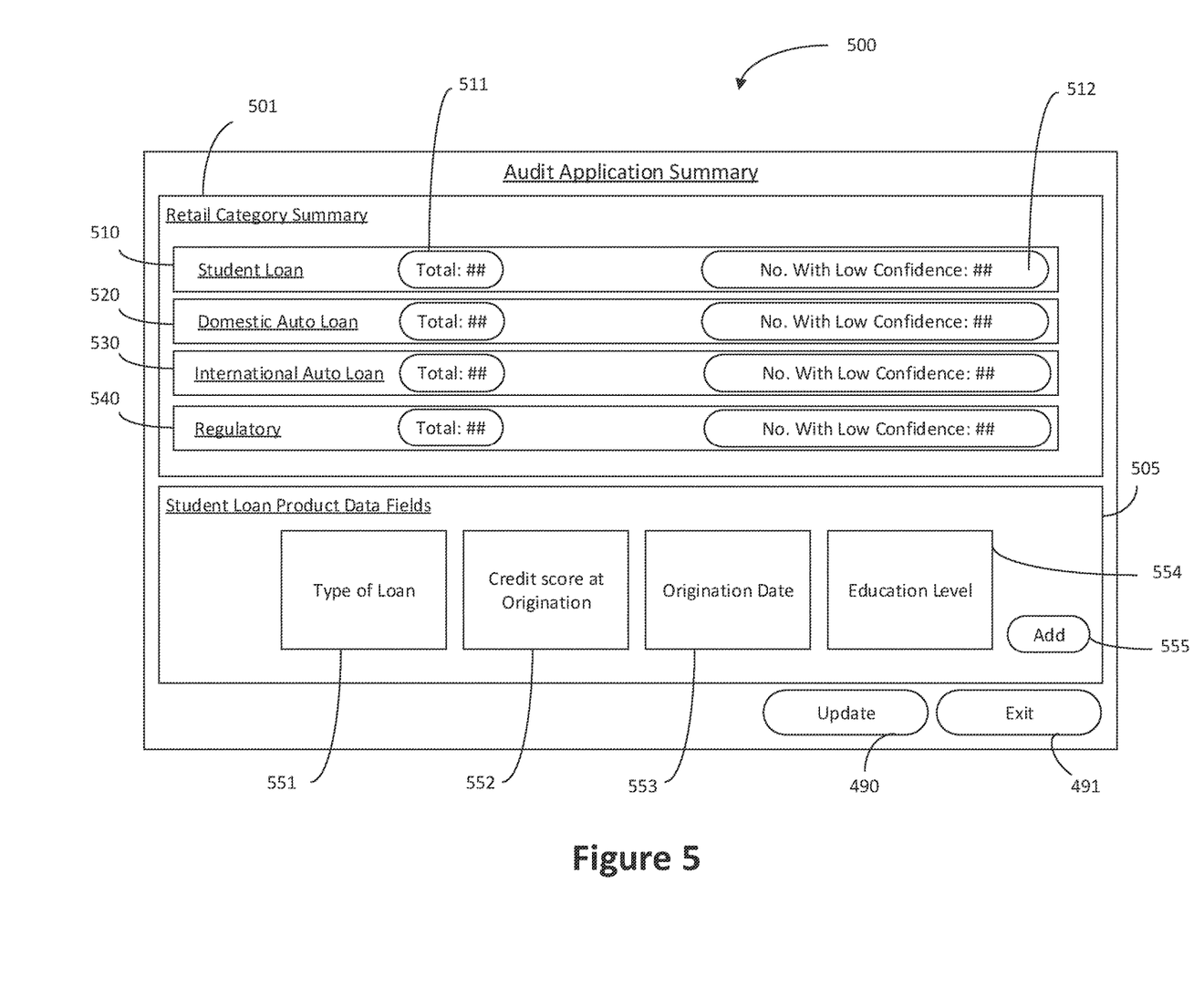
FIG. 5 depicts a graphical user interface of an audit application of a data analysis system in accordance with various potential embodiments.

Referring now to FIG. 5, a graphical user interface (GUI) 500 of a data analysis system is depicted in accordance with illustrative embodiments. For example, the graphical user interface 500 depicts a second output summary of the analysis of the documents. The second output summary depicts the interactive nature of the first output summary by showing that the output summary from the entity computing system 102 may be tiered, for example, by the generality of the data. The tiered scheme of the output summary allows for the enterprise computing system 102 to interact with the user in an intuitive manner by displaying general data, but when the general data is selected, showing more particularized data.

The second output summary depicts a summary of the retail category 501. For example, a user, via a user input, may have selected the retail category 410 icon causing the GUI 400 to redirect to GUI 500 displaying the more particular data related to the retail category 410. The summary of the retail category 501 includes a list of the types of products associated with the retail category 410. For example, the list may include a student loan type of product 510, a domestic auto loan type of product 520, an international auto loan type of product 530, and/or a regulatory 540 type of product. Each of the types of products may include respective graphical icons depicting representative results for the respective type of product. In some embodiments, the student loan type of product 510 includes a first graphical icon 511 indicating a total number of data instances associated with the student loan type of product 510, and a second graphical icon 512 indicating the total number of data instances in the student loan type of product 510 that have low confidence factors. In some embodiments, the types of products 510, 520, 530, and/or 540 may be selectable such that, when selected cause, the GUI 500 to redirect and display a list of data instances and associated data fields within the selected type of product.

The second output summary may also include a data fields section 505. The data fields section 505 depicts multiple graphical icons that each indicate a data field for a particular selected type of product. For example, the data fields section 505 depicts the pre-defined data fields for the student loan type of product 510. The pre-defined data fields may include a type of loan 551 (e.g., private or public), a credit score of the applicant at the time of loan origination 552, an origination date 553, and/or an education level associated with the student loan 554 (e.g., graduate, undergraduate, technical college, etc.). Each of the pre-defined data fields may be selectable such that, when selected, the GUI 500 redirects and provides a prompt box to the user to enter or select particular keywords that should be used to find the values within the unstructured data (e.g., documents) for the particular data field and/or enter a format that the respective value is expected to be in. The data fields section 505 may also include an "add" icon or button that, when selected, causes the GUI 500 to redirect and allow a user, via a user input, to enter in additional data fields that should be found in documents associated with the respective type of product.

Figure 6:
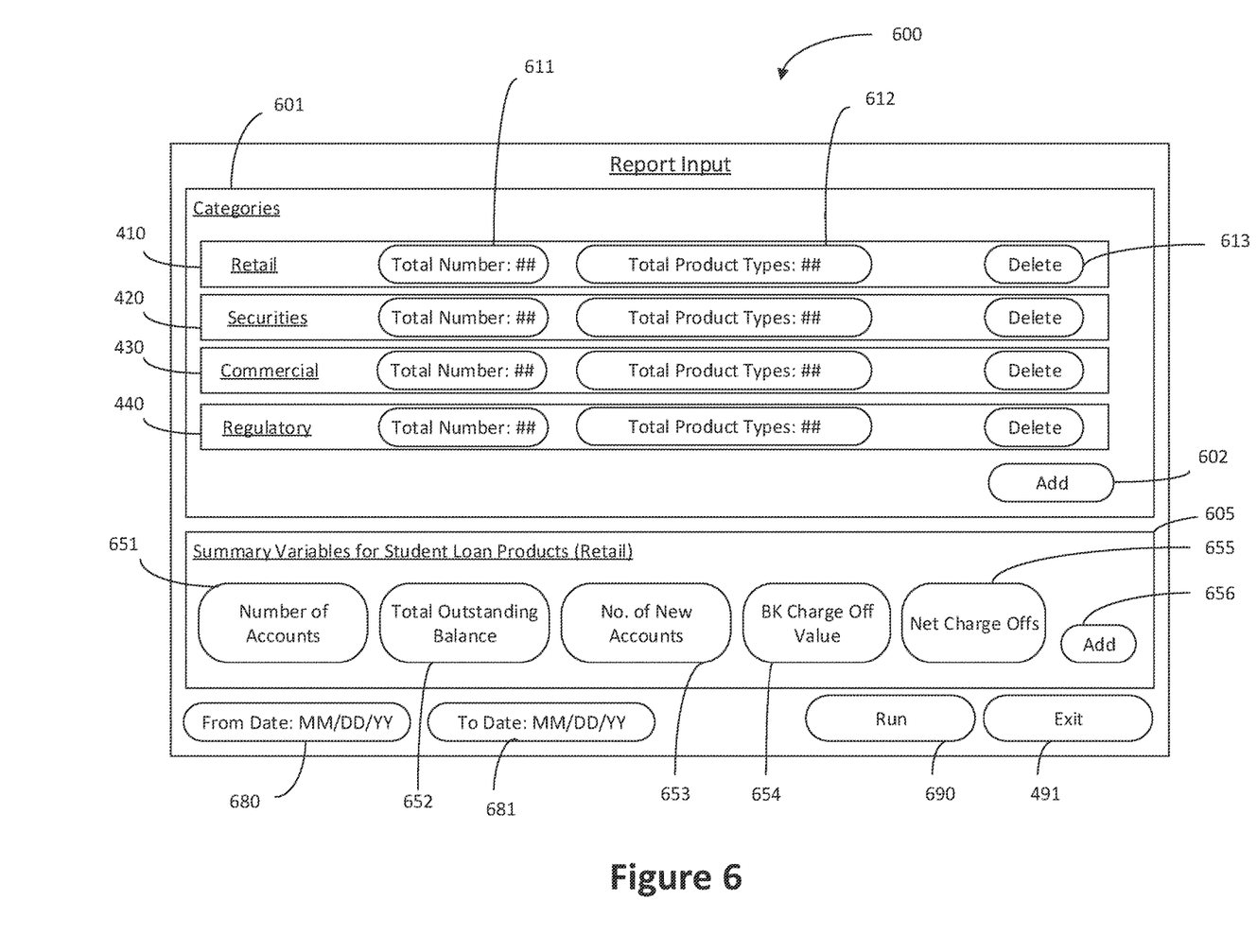
FIG. 6 depicts a graphical user interface of a report engine of a data analysis system in accordance with various potential embodiments.

Referring now to FIG. 6, a graphical user interface (GUI) 600 of a data analysis system is depicted in accordance with illustrative embodiments. For example, the graphical user interface 600 depicts various input options for a report. The GUI 600 may be provided by the enterprise computing system 102 to a display, for example, when a user navigates to a particular uniform resource locator (URL) or launches an application associated with the enterprise installed on one or more of the user computing devices 110a-c (e.g., or the branch computing systems 140a-c).

The input options may include a list of categories 601 that are to be included in the report. For example, the user may select to include additional categories by selecting the "add" icon 602. Moreover, a category (e.g., retail category 410) may optionally not be included in the report via the user selecting a respective "delete" graphical icon (e.g., graphical icon 613). Each category 410, 420, 430, and 440 may also include additional graphical icons indicating the total data set that will be used for the report. For example, the retail category 410 may include a first graphical icon 611 that depicts the total number of identified instances (e.g., identified within the reporting database 126) that will be used to generate a respective report, and a second graphical icon 612 that depicts the total number of identified types of products for the respective category that will be used to generate the respective report.

Moreover, the GUI 600 includes an indication of the constraints of the data instances accessed or generated and used by the enterprise computing system 102 for the respective report. For example, the GUI includes an indication of a "from" date (e.g., via indicator 680) and an indication of a "to" date (e.g., via indicator 681) such that only data instances having a date associated therewith between the "from" date to the "to" date are included in the respective report. In some embodiments, indicator 680 may be selected via a user input that allows a user to change or update the "from" date. Similarly, in some embodiments, the indicator 681 may be selected via a user input that allows for the user to change or update the "to" date. The GUI also includes a run icon 690 that may be selected by a user to cause the enterprise computing system 102 to perform at least operation 206 and output a report.

The GUI 600 also includes a summary variables section 605. For example, the summary variables section depicts a plurality of summary variables for the student loan type of product for the retail category. The summary variables indicate to the enterprise computing system 102 the values that should be included within the report. For example, during the generation of the report, the enterprise computing system 102 may determine a value for each of the plurality of summary values based on one or more respective rules or formulas and respective data instances. In this way, the enterprise computing system 102 is again able to dynamically and reliably transform the structured data (e.g., data instances) into another form (e.g., values for the summary variables) and output the report. For example, the summary variables for the student loans products may include a number of accounts 651, a total outstanding balance of all of the accounts 652, a number of new accounts 653 (e.g., new accounts within a particular reporting period), a bankruptcy charge off value 654, and/or a net charge off value 655. In some embodiments, each of the summary variables 651-655 may be selectable such that, when selected, cause the GUI 600 to redirect and display options for the user to manually set one or more rules of formulas to calculate or determine a value for the respective summary variable. Moreover, the summary variables section 605 may include an "add" icon 656 that, when selected, causes the GUI 600 to redirect and display a prompt that allows a user, via a user input, to add additional summary variables and/or associated formulas for calculating the respective values.

Figure 7:
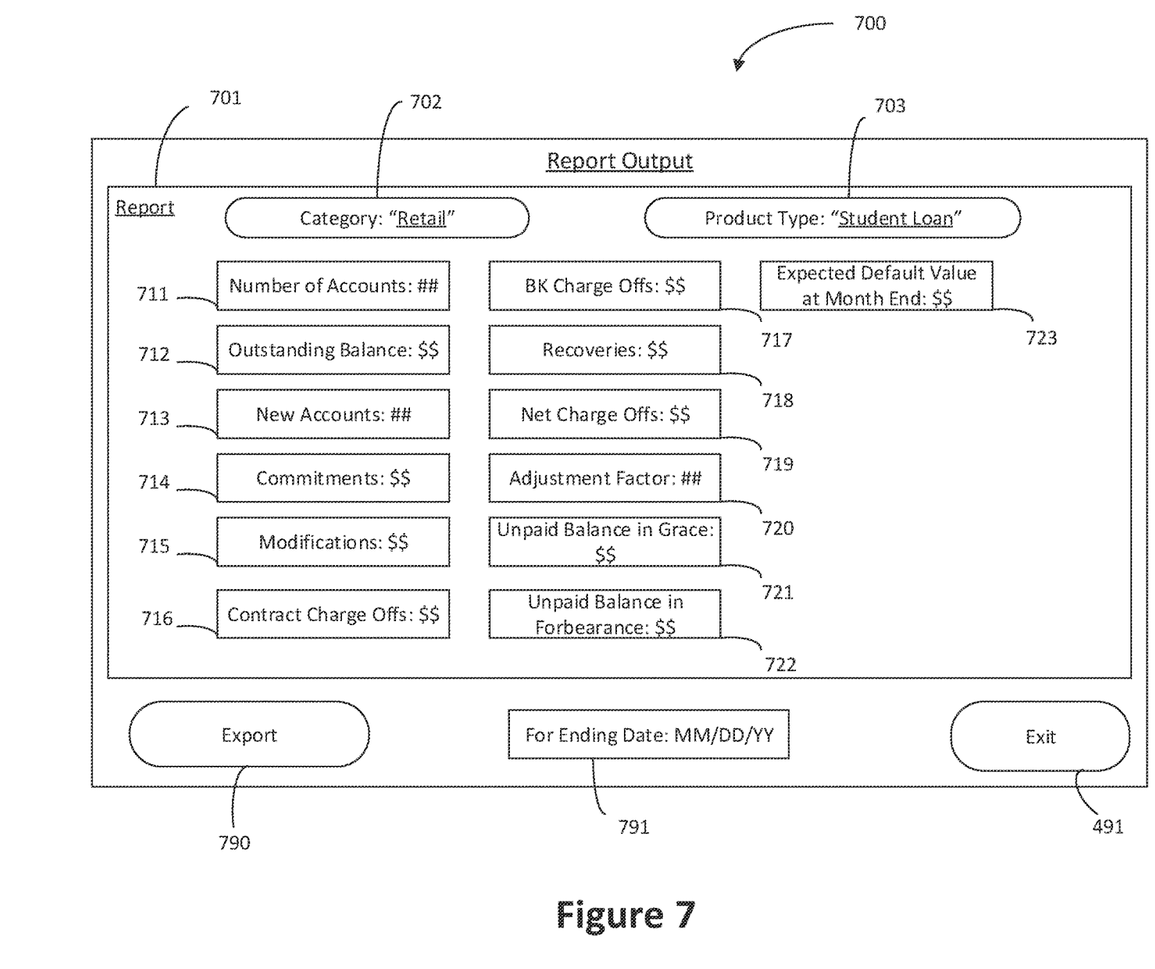
FIG. 7 depicts a graphical user interface of a report engine of a data analysis system in accordance with various potential embodiments.

Referring now to FIG. 7, a graphical user interface (GUI) 700 of a data analysis system is depicted in accordance with illustrative embodiments. For example, the graphical user interface depicts a report output from the enterprise computing system 102. The GUI 700 may be provided by the enterprise computing system 102 to a display similar to as described in reference to process 206. The report output includes a report section 701, an export icon 790, and an ending date indicator 791 that indicates the last date that data instances were included in the report. The report section 701 includes a first graphical icon 702 depicting the category that the summary variables are being displayed for, and a second graphical icon 703 depicting the type of product that the summary values are being displayed for, and respective values for the pre-defined summary variables 711-723. The export icon 790 may be selected that causes the report to be automatically downloaded, emailed, or otherwise transmitted in a pre-determined format (e.g., text file, PDF, excel file). In some embodiments, the export icon 790, when selected, may automatically cause the enterprise computing system 102 to generate a report in compliance with a particular regulatory format (e.g., generate a PDF file in a 10Q format).

The summary variables (e.g., that may either be hard coded or set via section 605) have been calculated based on the data instances and/or other data (e.g., data from a last reporting date). Thus, the values in the respective summary variables 711-723 include comprehensive, verified data (e.g., verified via the confidence factor). In this way, the enterprise computing system 102 is able to transform unstructured data (e.g., documents), into a structured data set (e.g., data instances in a reporting database), interact with a user to resolve any identified issues (e.g., identified via the confidence factor), and generate a report having summary or global variables based on the structured data in order to efficiently, comprehensively, and reliably generate one or more reports that, for example, indicate a status of the enterprise and ensure that the enterprise is in compliance with internal and regulatory compliance.

As used herein, the terms "application," "computing device," "computing system" and/or "engine" may include hardware structured to execute the functions described herein. In some embodiments, each respective "application," "computing device," "computing system" and/or "engine" may include machine-readable media for configuring the hardware to execute the functions described herein. The circuit may be embodied as one or more circuitry components including, but not limited to, processing circuitry, network circuits, peripheral devices, input devices, output devices, and sensors. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "application," "computing device," "computing system" and/or "engine." In this regard, the "application," "computing device," "computing system" and/or "engine" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on).

The "application," "computing device," "computing system" and/or "engine" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., application A and application B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud-based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud-based server). To that end, an "application," "computing device," "computing system" and/or "engine" as described herein may include components that are distributed across one or more locations. Further, it is to be appreciated that the terms "server," "server system," "memory," "memory device," and "cloud based computing" are all understood to connote physical devices that have a structure. It should be understood that no claim element herein is to be construed under the provisions of 35 U.S.C. § 112(f), unless the element is expressly recited using the phrase "means for."

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed is:

1. A method comprising:

accessing, via a processor, from a document database, a plurality of electronic documents and a respective data instance for each of the plurality of electronic documents, the respective data instance comprising a plurality of data fields;

transforming, via the processor, data of the plurality of electronic documents into a plurality of values for each of the plurality of data fields, wherein transforming the data of the plurality of electronic documents comprises applying a respective character recognition algorithm to the plurality of electronic documents;

presenting, via the processor, a first graphical user interface comprising (i) a first interactive element enabling selection of at least one category for a report, (ii) a second interactive element enabling selection of at least one summary variable for the report, and (iii) a third interactive element causing generation of the report; and in response to an interaction with the third interactive element, generating, via the processor, a second graphical user interface comprising the report generated using at least two data instances of a plurality of data instances of the plurality of electronic documents, the at least two data instances selected based on the at least one category selected via the first interactive element and the at least one summary variable selected via the second interactive element.

2. The method of claim 1, further comprising:
generating, via the processor, a confidence factor for each of the plurality of values, wherein the confidence factor for a respective value of the plurality of values is calculated based on a number of characters of a respective keyword in a respective electronic document associated with the respective value that match corresponding characters of an expected keyword.

3. The method of claim 2, further comprising:
storing, via the processor, the respective data instance for each of the plurality of electronic documents comprising the plurality of values for each of the plurality of data fields within a second database in association with the confidence factor of each of the plurality of values.

4. The method of claim 1, further comprising providing, via the processor to a display, a graphical user interface comprising a summary of the respective data instance for each of the plurality of electronic documents, wherein the summary comprises an indication of data fields having a confidence factor below a threshold.

5. The method of claim 1, wherein storing the respective data instance for each of the plurality of electronic documents comprises storing each data instance within a respective category, wherein the respective category is based on a type of product.

6. The method of claim 1, further comprising identifying a type of product based on a context of each electronic document, and determining the plurality of data fields for the respective data instance further based on the context.

7. The method of claim 1, further comprising providing, via the processor to a display, the second graphical user interface comprising the report.

8. The method of claim 1, wherein applying the respective character recognition algorithm to a respective electronic document of the plurality of electronic documents comprises converting the respective electronic document into a searchable format, wherein the respective character recognition algorithm is based on a file type of the respective electronic document.

9. The method of claim 1, wherein transforming the data of the plurality of electronic documents comprises determining one or more keywords associated with a respective data field, parsing contents of a respective electronic document for the one or more keywords, and identifying a respective value for the respective data field based on the one or more keywords.

10. The method of claim 9, further comprising assigning a confidence factor for each of the plurality of values, wherein assigning the confidence factor comprises at least one of:
determining a Levenshtein Distance for the one or more keywords found in the contents of the respective electronic document relative to an expected value of the one or more keywords; or
determining a location in the respective electronic document that the one or more keywords were found in the respective electronic document, and comparing the location to an expected location.

11. The method of claim 1, further comprising assigning a confidence factor for each of the plurality of values, wherein the confidence factor of a value that cannot be found is set to a lowest possible value.

12. A computer implemented method of analyzing a state of an enterprise, the method comprising:
accessing, via a processor, from a document database, a plurality of electronic documents and a data instance for a first document of the plurality of electronic documents, the data instance comprising a plurality of data fields that are based on a first type of product determined to be associated with the first document;
transforming, via the processor, data of the first document to identify one or more values for each of the plurality of data fields, wherein transforming the data of the first document comprises applying a character recognition algorithm to the first document;
presenting, via the processor, a first graphical user interface comprising (i) a first interactive element enabling selection of at least one category for a report, (ii) a second interactive element enabling selection of at least one summary variable for the report, and (iii) a third interactive element causing generation of the report; and
in response to an interaction with the third interactive element, generating, via the processor, a second graphical user interface comprising the report generated using at least two data instances of a plurality of data instances of the plurality of electronic documents, the at least two data instances selected based on the at least one category selected via the first interactive element and the at least one summary variable selected via the second interactive element.

13. The method of claim 12, wherein transforming the data of the first document comprises:
identifying, by the processor, a file type of the first document;
converting, by the processor, the first document into a searchable file type using the character recognition algorithm, the character recognition algorithm based on the file type;
parsing, by the processor, text of the first document to identify a keyword associated with a first data field of the plurality of data fields; and
identifying, by the processor, a first value for the first data field based on the keyword.

14. The method of claim 13, wherein the first value is a value in the first document subsequent to the keyword.

15. The method of claim 14, wherein transforming the data of the first document further comprises:

determining, by the processor, a Levenshtein Distance between the keyword identified in the first document and an expected keyword; and determining, by the processor, a first confidence factor for the first value based on the Levenshtein Distance.

16. The method of claim 14, wherein transforming the data of the first document further comprises:

determining, by the processor, a location of the first value within the first document; and determining, by the processor, a first confidence factor for the first value based on the location of the first value.

17. The method of claim 12, further comprising storing the data instance within a second database, the data instance including an indication of the first type of product, a pointer to the first document, and the one or more values for each of the plurality of data fields.

18. A system, comprising:

a display configured to present graphical user interfaces (GUI);

a memory comprising a first database; and a processor and program logic stored in the memory and executed by the processor, the program logic including auditing logic configured to:

access a plurality of electronic documents from the first database and a data instance for a first document of the plurality of electronic documents, the data instance comprising a plurality of data fields that are based on a first type of product determined to be associated with the first document;

analyze the first document to identify one or more values for each of the plurality of data fields, wherein analyzing the first document comprises applying a character recognition algorithm to the first document;

present, via the display, a first graphical user interface comprising (i) a first interactive element enabling selection of at least one category for a report, (ii) a second interactive element enabling selection of at least one summary variable for the report, and (iii) a third interactive element causing generation of the report; and in response to an interaction with the third interactive element, generating, via the processor, a second graphical user interface comprising the report generated using at least two data instances of a plurality of data instances of the plurality of electronic documents, the at least two data instances selected based on the at least one category selected via the first interactive element and the at least one summary variable selected via the second interactive element.

19. The system of claim 18, the program logic further comprising expected value logic configured to:

store the data instance within a second database, wherein the data instance is stored in a category of the second database that is associated with the first type of product.

20. The system of claim 18, the program logic further configured to:

generate the second graphical user interface to include an indication of values having confidence factors below a pre-defined threshold.

* * * * *